US011182282B2

(12) United States Patent
Hicks et al.

(10) Patent No.: US 11,182,282 B2
(45) Date of Patent: Nov. 23, 2021

(54) EXECUTING TESTS IN DETERMINISTIC ORDER

(71) Applicant: INTERNATIONAL BUSINESS MACHINES CORPORATION, Armonk, NY (US)

(72) Inventors: Andrew C. M. Hicks, Wappingers Falls, NY (US); Ryan Thomas Rawlins, New Paltz, NY (US); Deborah A. Furman, Staatsburg, NY (US); Michael E. Gildein, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 29 days.

(21) Appl. No.: 16/804,164

(22) Filed: Feb. 28, 2020

(65) Prior Publication Data

US 2021/0271592 A1    Sep. 2, 2021

(51) Int. Cl.
*G06F 11/00*  (2006.01)
*G06F 11/36*  (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3684; G06F 11/3688; G06F 11/3692

See application file for complete search history.

(56) References Cited

U.S. PATENT DOCUMENTS

| 8,260,826 B2 * | 9/2012 | Chen ................. G06F 16/24568 707/803 |
| 8,271,950 B2 | 9/2012 | Bharadwaj |
| 9,665,350 B1 | 5/2017 | Kalmar et al. |
| 10,803,050 B1 * | 10/2020 | Salkola ................. G06Q 10/00 |

(Continued)

FOREIGN PATENT DOCUMENTS

WO    201891090 A1    5/2018

OTHER PUBLICATIONS

Cohen, D.M. et al., The combinatorial design approach to automatic test generation, 1996 [retrieved on Jan. 14, 2021], IEEE Software vol. 13, Issue 5, downloaded from <url>:https://ieeexplore.ieee.org/. (Year: 1996).

(Continued)

*Primary Examiner* — Joshua P Lottich
(74) *Attorney, Agent, or Firm* — Cantor Colburn LLP; Teddi Maranzano

(57) ABSTRACT

A method for detecting and localizing a fault in a system under test (SUT) includes generating an initial set of test vectors that provides complete n-wise coverage of the reduced test space. The method further includes generating and executing an initial set of test cases to obtain a first set of execution results. The method further includes determining, based at least in part on the first set of execution results, that one or more test cases failed execution. The method further includes generating a set of new test cases from a selected failing test case. The method further includes executing the set of new test cases to obtain a second set of execution results. The method further includes detecting and localizing the fault based at least in part on the second set of execution results.

25 Claims, 8 Drawing Sheets

(56) References Cited

U.S. PATENT DOCUMENTS

| | | | |
|---|---|---|---|
| 2003/0233600 A1* | 12/2003 | Hartman | G01R 31/318307 714/32 |
| 2010/0274520 A1* | 10/2010 | Ur | G06F 11/3676 702/123 |
| 2011/0088018 A1 | 4/2011 | Foley | |
| 2012/0047250 A1 | 2/2012 | Lai | |
| 2012/0174231 A1 | 7/2012 | Avritzer | |
| 2012/0259576 A1 | 10/2012 | Thulasidasan et al. | |
| 2012/0260132 A1* | 10/2012 | Blue | G06F 11/3676 714/38.1 |
| 2013/0091382 A1* | 4/2013 | Segall | G06F 11/3684 714/32 |
| 2014/0059081 A1 | 2/2014 | Farchi et al. | |
| 2014/0137057 A1* | 5/2014 | Tzoref-Brill | G01R 31/318314 716/107 |
| 2014/0173349 A1* | 6/2014 | Farchi | G06F 11/008 714/37 |
| 2014/0266243 A1 | 9/2014 | Baker | |
| 2015/0046906 A1* | 2/2015 | Segall | G06F 11/3676 717/124 |
| 2015/0094997 A1* | 4/2015 | Ivrii | G06F 11/3684 703/2 |
| 2015/0234007 A1 | 8/2015 | Amano et al. | |
| 2016/0019071 A1 | 1/2016 | Webb | |
| 2016/0085665 A1 | 3/2016 | Junker et al. | |
| 2016/0154728 A1 | 6/2016 | Bassin et al. | |
| 2019/0155717 A1* | 5/2019 | Hess | G06K 9/6215 |
| 2019/0188120 A1* | 6/2019 | Luss | G06F 11/3684 |
| 2020/0117580 A1* | 4/2020 | Lekivetz | G06F 11/3684 |

OTHER PUBLICATIONS

Hicks et al., "Reduction of Testing Space for System Testing Infrastructure Using Combinatorics," U.S. Appl. No. 16/804,157, filed Feb. 28, 2020.

List of IBM Patents or Patent Applications Treated as Related; Date Filed: Mar. 10, 2020, 2 pages.

PCT International Search Report; dated May 17, 2021; Application No. PCT/IB2021/051033; Filed: Feb. 9, 2021; 9 pages.

* cited by examiner

EXECUTING TESTS IN DETERMINISTIC ORDER

BACKGROUND

The present invention relates to testing of a computer program and, more specifically, reduction of test case infrastructure.

Computerized devices control almost every aspect of our life—from writing documents to controlling traffic lights. However, newly designed computerized devices are often error-prone, and thus require a testing phase in which the errors are discovered and corrected. The testing phase is considered one of the most difficult tasks in designing a computerized device. Thorough testing is important, as the cost of not discovering an error may be enormous depending on how the computerized device is utilized. Coverage tools for checking software provide a measure of how well the software being evaluated has been exercised during testing and thereby give a level of assurance that the software is of high quality.

SUMMARY

According to one or more embodiments of the present invention, a method for detecting and localizing a fault in a system under test (SUT) includes modeling inputs to the SUT as a collection of attribute-value pairs, and assigning a probability value to each attribute-value pair from the collection of attribute-value pairs. The method further includes reducing a Cartesian product space comprising all possible combinations of the attribute-value pairs to a reduced test space, at least in part by excluding one or more combinations of attribute-value pairs based on corresponding probability values. The method further includes generating an initial set of test vectors that provides complete n-wise coverage of the reduced test space. The method further includes generating an initial set of test cases from the initial set of test vectors. The method further includes executing the initial set of test cases to obtain a first set of execution results. The method further includes determining, based at least in part on the first set of execution results, that one or more test cases failed execution. The method further includes generating a set of new test cases from a selected failing test case. The method further includes executing the set of new test cases to obtain a second set of execution results. The method further includes detecting and localizing the fault based at least in part on the second set of execution results.

In one or more embodiments of the present invention, the Cartesian product space is further reduced based on an architectural restriction of the SUT. Further, in one or more embodiments of the present invention, the architectural restriction includes at least one of: a requirement that a first attribute cannot take on one or more candidate attribute values if a second attribute has a particular attribute value, a requirement that the first attribute must take on a particular candidate attribute value if the second attribute has the particular attribute value, or a requirement to introduce a third attribute if the second attribute has the particular attribute value.

In one or more embodiments of the present invention, an attribute-value pair and a corresponding probability value are represented in a hash. Further, a first attribute-value pair that is to be tested is assigned a first probability value that is higher than a second probability value of a second attribute-value pair.

In one or more embodiments of the present invention, detecting and localizing the fault based at least in part on the second set of execution results comprises determining a particular combination of attribute values that causes the fault. Generating a regression bucket of failing test cases based at least in part on the particular combination of attribute values that causes the fault.

The technical solutions can also be implemented by a system, a computer program product, an apparatus, a machine, a device, or in other practical applications in one or more embodiments of the present invention.

Additionally, in one or more embodiments of the present invention, a method for detecting and localizing a fault in a system under test (SUT) includes modeling inputs to the SUT as a collection of attribute-value pairs. The method further includes assigning a probability value to each attribute-value pair from the collection of attribute-value pairs. The method further includes reducing a Cartesian product space comprising all possible combinations of the attribute-value pairs to a reduced test space, at least in part by excluding one or more combinations of attribute-value pairs based on corresponding probability values. The method further includes generating an initial set of test vectors that provides complete n-wise coverage of the reduced test space. The method further includes generating an initial set of test cases from the initial set of test vectors. The method further includes executing the initial set of test cases to obtain a first set of execution results. The method further includes determining, based at least in part on the first set of execution results, that one or more test cases failed execution. The method further includes generating a set of new test cases from a selected failing test case, wherein generating the set of new test cases comprises generating, in relation to each attribute in the selected failing test case, a respective subset of new test cases at least in part by changing a respective attribute value for the attribute in the selected failing test case to each other candidate attribute value for the attribute that is not present in any of the one or more test cases that failed execution. The method further includes executing the set of new test cases to obtain a second set of execution results. The method further includes detecting and localizing the fault based at least in part on the second set of execution results.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
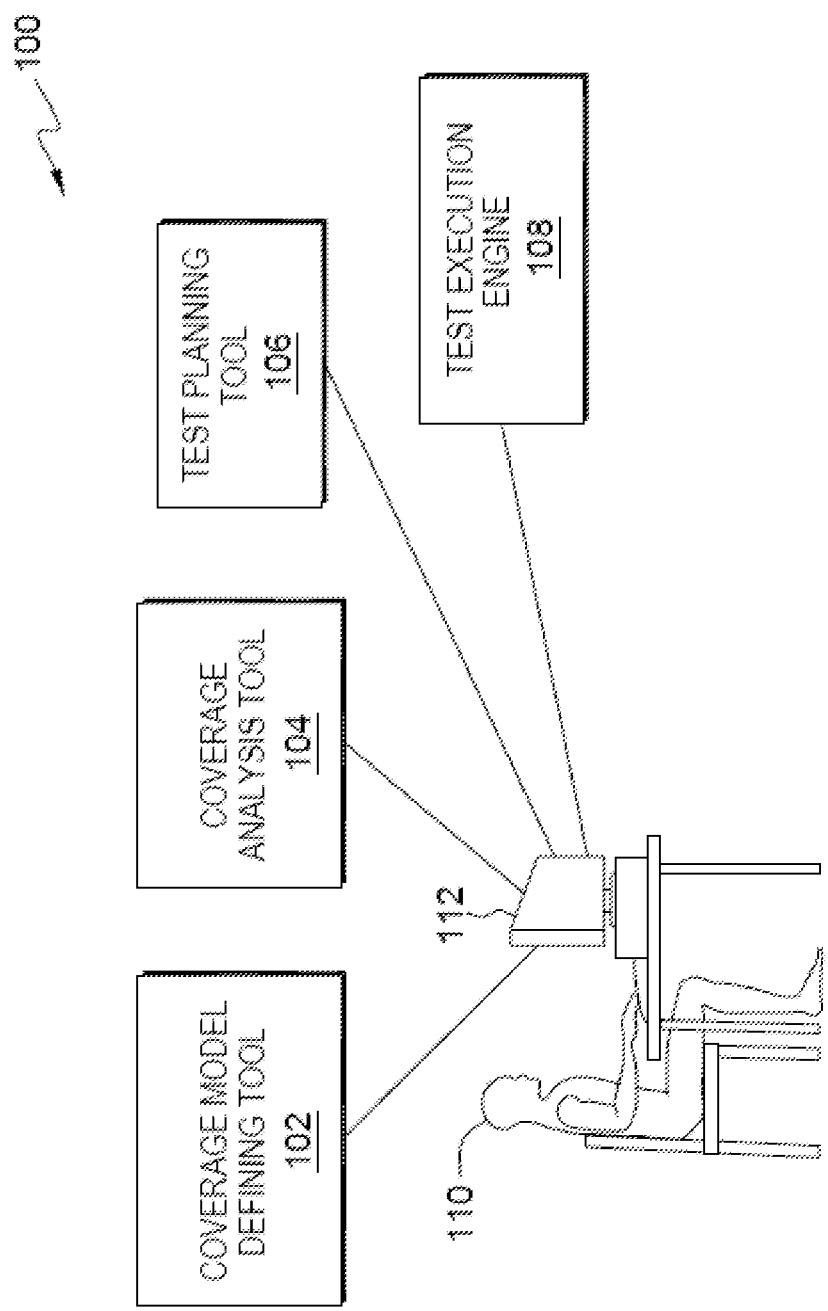
FIG. 1 shows a schematic illustration of a computerized environment in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

DETAILED DESCRIPTION

Exemplary embodiments of the present invention relate to, among other things, devices, systems, methods, computer-readable media, techniques, and methodologies for performing fault detection and localization using combinatorial test design (CTD) techniques and for generating a regression bucket of test cases that expose the detected fault. In exemplary embodiments of the present invention, the detected and localized fault occurs in a system under test (SUT). The SUT may be a hardware system or a software system. Further, in exemplary embodiments of the present invention, the fault detection and localization may be performed while adhering to architectural restrictions on the SUT.

Additionally, coverage tools for testing the SUT provide a measure of how well the SUT has been exercised during testing and thereby give a level of assurance that the SUT is of high quality. There are a number of types of coverage known in the art, such as statement coverage, line coverage, condition coverage, path coverage, method coverage, and the like. One additional coverage method is functional coverage. Functional coverage is designed to measure an amount, portion or similar metric of tests that examined predetermined functional behaviors. Once functional coverage is measured, quality assurance (QA) personnel may design additional tests to examine untested behaviors.

However, test infrastructure can become incredibly expensive and cost per test cycle increases without continuous optimization of products, tests, and environments. As more tests are added, more test suites are run, and the complexity of the supporting services increases along with the cost of each test cycle. Test environments, test dependencies, and test suites need to be managed with the same rigor as the product being shipped (i.e., the SUT). Accordingly, managing the test infrastructure is a technical challenge, and in turn, efficient reduction of the test infrastructure is a technical challenge. It should be noted that the reduction of the test infrastructure does not imply a reduction in quality of testing the SUT. Rather, the technical challenge is that the quality of the tests is to be improved along with the reduction in the test infrastructure.

Embodiments of the present invention address such technical challenges. According to one or more embodiments of the present invention, a reduced set of test cases for a SUT are executed on the system. It should be noted that the system is different than the SUT; the SUT is being executed using the system. The reduced set of test cases can be generated using combinatorics test designing (CTD). Errors can be identified based on a subset of tests that fail from that reduced set. Further, according to one or more embodiments of the present invention, inverse CTD is used to localize the fault in the system.

According to one or more embodiments of the present invention, CTD is performed with respect to an interaction requirement, such as a pair-wise interaction, n-tuple interaction, or any other. The test plan may provide for sufficient coverage tasks that assure that the interaction requirement is fulfilled. In some exemplary embodiments, test planning is based on a modeling of the test space using a functional coverage model. The test space can represent inputs, scenarios, configurations, the application's internal state, or any other aspect that might need to be tested. The functional coverage model may include a set of functional attributes. In other embodiments of the present invention, the coverage model can include one from a number of types of coverage known in the art, such as statement coverage, line coverage, condition coverage, path coverage, method coverage, and the like. The type of coverage does not affect reduction of the test infrastructure techniques described herein.

Further, with respect to test planning, a test-space may define potential tests that may be executed on the SUT. A test can be associated with exactly one potential test, as opposed to coverage tasks. In some exemplary embodiments of the present invention, several different tests may hold the same potential test.

In some exemplary embodiments of the present invention, the motivation for the approach of CTD is that most errors depend on the interaction between a small number of functional attributes. CTD algorithms may also deal with scalability issues. The CTD algorithms may assume that the combinations space is too large to be represented explicitly, and they use various techniques to try to generate an optimized test plan without explicitly enumerating all possible combinations. Examples of such algorithms may be a reduction to the orthogonal arrays or covering array problems. Those techniques are limited in the type of restrictions they allow on the value combinations, or in the type of requested interaction level, and still hit scalability issues as the number of model variables increases.

In example embodiments of the present invention, inputs to a SUT are modeled as a collection of attribute-value pairs. More specifically, inputs to a SUT can be modeled as a collection of attributes, each of which can take on one or more corresponding attribute values. In example embodiments of the present invention, the entire Cartesian product space that contains all possible combinations of attribute-value pairs can be reduced to a smaller set of test vectors that provides complete n-wise coverage of the entire test space. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of possible combinations of attribute-value pairs would be 4*3*3*2=72. Thus, in this illustrative example, the entire Cartesian product space would include 72 different combinations of attribute-value pairs. As previously noted, these 72 different combinations of attribute-value pairs can be reduced down to a smaller set of combinations that still provide complete n-wise coverage of the Cartesian product space. For instance, referring to the same example introduced above, if complete pairwise coverage is sought, then the 72 different combinations can be reduced down to 12 distinct combinations that together include every possible pairwise interaction of attribute values. The reduced number of combinations required to provide n-wise coverage may increase logarithmically as n increases.

In exemplary embodiments of the present invention, the entire Cartesian product space including all combinations of attribute-value pairs is reduced down to a smaller set of CTD test vectors that provides complete n-wise coverage for a desired n. In complex hardware or software systems, the total number of attributes and corresponding candidate attribute values may be quite large, in which case, the total number of possible combinations of attribute values making up the entire Cartesian product space may be astronomically large, making it practically infeasible to test all possible combinations. Reduction of the entire Cartesian product space down to a substantially smaller number of CTD test vectors that still provide complete n-wise coverage allows for any n-wise (or m-wise where m<n) fault to be detected without having to directly test every possible combination in the test space.

In exemplary embodiments of the present invention, a binary decision diagram or the like may be used to perform the reduction and identify the reduced set of CTD vectors that provides complete n-wise coverage. In example embodiments of the present invention, each CTD test vector that is generated includes a unique combination of attribute values, and the set of CTD test vectors together include every possible n-wise interaction of attribute values. In particular, each CTD vector may have a dimension corresponding to the number of attributes that are modeled, where each element of the CTD vector is a respective attribute value for a corresponding attribute. The set of CTD vectors that is generated, however, may not be unique. That is, there may be multiple different sets of CTD vectors, each of which provides complete n-wise coverage. In example embodiments of the present invention, the CTD vectors may be chosen at random while still ensuring complete n-wise coverage. In other example embodiments, the initial set of CTD vectors may be chosen with specific criteria in mind such as, for example, to increase or decrease the representation of particular attribute values within the set of CTD vectors.

In exemplary embodiments of the present invention, once the initial set of CTD test vectors are generated, they are used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector.

In exemplary embodiments of the present invention, the test cases are then executed. The execution of each test case results in either a successful execution result, indicating that the combination of attribute values associated with the test case does not contain an n-wise (or m-wise where m<n) error, or a failure execution result, indicating that the combination of attribute values associated with the test case do contain an n-wise (or m-wise where m<n) error. In example embodiments of the present invention, a particular failing test case is then selected and inverse combinatorics is applied to the failing test case to produce a new set of test cases capable of exposing the bug. In exemplary embodiments of the present invention, application of inverse combinatorics to the selected failing test case includes generating a respective new test case with respect to each attribute. Thus, the number of new test cases generated may be equal to the number of attributes. In exemplary embodiments of the present invention, in each new test case, the attribute value of a corresponding attribute in the selected failing test case is changed to an attribute value for that attribute that is not present in any failing test case and the respective attribute value for each other attribute is unchanged from that which is present in the selected failing test case.

Those new test case(s) that yield a successful execution result may then be assessed to detect and localize the n-wise (or m-wise where m<n) error. In particular, the specific attribute-value pairs that cause the error may be identified based on those new test cases that successfully execute. A regression bucket of test cases may then be generated based on the error-producing combination of attribute-value pairs. More specifically, every possible combination of attribute values that include the attribute values determined to cause the error may be determined and a regression bucket of corresponding test cases for testing these combinations can be outputted for use by a manual tester, for example. In particular, In example embodiments of the present invention, all test cases contained in the regression bucket will fail when executed until the bug is fixed, after which all regression bucket test cases should pass (i.e., produce a successful execution result).

In exemplary embodiments of the present invention, architectural restrictions may apply to the SUT. Architectural restrictions may include any of a variety of restrictions on inputs to the SUT. For instance, an example restriction may be that if a given attribute has a particular attribute value, then one or more other attributes are excluded from having certain attribute value(s). Another example architectural restriction may be that if a given attribute has a particular attribute value, then one or more other attributes must have certain attribute value(s). Yet another example architectural restriction may be that a new attribute is introduced if and only if a particular attribute has a particular attribute value. It should be appreciated that the above examples of architectural restrictions are merely illustrative and not exhaustive.

In exemplary embodiments of the present invention, architectural restrictions are taken into account prior to performing the reduction of the entire Cartesian space down to the initial set of CTD vectors that provides the desired complete n-wise coverage. That is, in exemplary embodiments of the present invention, particular combinations of attribute values that violate any architectural restrictions are first excluded from the Cartesian product space, and then the reduction down to the set of CTD vectors that provides complete desired n-wise coverage is performed. In this manner, it can be ensured that no combination of attribute values that violates an architectural restriction is included in the initial set of CTD vectors. Further, In exemplary embodiments of the present invention, when a selected test case corresponding to an initial CTD vector fails and is selected for expansion to obtain a set of new test cases designed to detect and localize an n-wise error, that expansion can be performed first without taking into account any architectural restrictions. Then, any new test cases that violate an architectural restriction can be excluded. In this manner, it can be ensured that the expansion provides as much coverage of the test space in the neighborhood around the failing test case as possible. In addition, in exemplary embodiments of the present invention, the regression bucket of failing test cases may first be generated without regards to architectural restrictions, and then any test cases that violate an architectural restriction can be excluded from the regression bucket. That is, test cases corresponding to all possible combinations in the entire Cartesian product test space that include the particular combination of attribute values causing an n-wise or lesser order error may first be generated and then reduced down to exclude any test case(s) that violate a restriction. Alternatively, the test cases included in the regression bucket may be selected from the reduced Cartesian space from which the initial set of CTD vectors are selected, in which case, the regression bucket is generated to include only those combinations of attribute values that include the subset of attribute values causing the error and that do not violate any architectural restriction.

Example embodiments of the invention include various technical features that yield technical effects that provide various improvements to computer technology. For instance, exemplary embodiments of the invention include the technical feature of inverse combinatorics to expand a set of test cases from a selected failing test case. This technical feature allows for an n-wise or lesser order fault to be detected and localized within a single iteration of the expansion. This technical effect represents an improvement to debugging and fault detection computer technology because it automates the creation of additional test cases around a selected failing test case in a manner that is specifically designed to facilitate detection and localization of a fault. Thus, the automated generation of new test cases in accordance with example embodiments of the invention is capable of exposing a fault more efficiently and using a fundamentally different methodology than manual test case generation. Exemplary embodiments of the invention also include the technical feature of generating a regression bucket of test cases that tests every possible combination of attribute values that includes the particular subset of attribute values causing the n-wise fault. Thus, the regression bucket includes only test cases that would all fail prior to correction of the fault and that would all pass after correction of the fault. Thus, the automated generation of a regression bucket of failing test cases in accordance with example embodiments of the invention provides an improvement to computer technology by providing a tester or automated testing algorithm with a set of test cases—each of which is ensured to fail—such that the tester or automated testing algorithm can use the regression bucket of test cases to verify that a fault has been corrected when all test cases ultimately pass after debugging is performed.

A technical challenge with using tests generated using CTD is in the case of generating test programs that require a particular order of operations of actions to be performed on the SUT. In this case, it is a technical challenge to reduce the testing space using the present CTD technology. For example, consider that the following actions (A, B, and C) can occur in any order on the SUT and that a test requires to have a set of breakpoints within each action to occur before the next action takes place:

Action A<runToCompletion, StopBkpt1, StopBkpt2, StopBkpt3>
Action B<runToCompletion, StopBkpt4, StopBkpt5>
Action C<runToCompletion, StopBkpt6>

Here, each of the actions A, B, and C, can be an operation that can be performed by/on the SUT. Each action can be associated with at least one attribute and particular value(s) can be assigned to the attribute(s) for each test. Based on the assigned value(s) a desired result is expected off the test. If the desired result is obtained the test is considered to pass, and otherwise the test is considered to fail. For example, the action A can be associated with an attribute A-a that is assigned a value a1 in a first test, a2 in a second test, and so on. The value assigned to A-a can be different in each test. The values of a1, a2, etc. are specified, for example, a1=runToCompletion, a2=StopBkpt1, a3=StopBkpt2 and a4=StopBkpt3.

Now, referring to the actions A, B, and C, above, consider any of the following orders of operations of the actions is what is required for a test of the SUT: ABC, ACB, BAC, BCA, CAB, and CBA. In any of these orders of operations, if the any of the actions does not run to completion, rather stops at a breakpoint, and then runs to completion only after another action(s) has/have taken place, the orders of operations may be like the following four examples:
1. A<StopBkpt1>-B<runToCompletion>-A<runToCompletion>-C<runToCompletion>,
2. A<StopBkpt1>-B<runToCompletion>-C<runToCompletion>-A<runToCompletion>;
3. A<StopBkpt1>-B<runToCompletion>-A<StopBkpt3>-C<runToCompletion>-A<runToCompletion>; and
4. A<StopBkpt2>-B<StopBkpt4>-A<runToCompletion>-C<StopBkpt6>-B<runToCompletion>-C<runToCompletion>.

Given the present CTD technology of identifying attribute/value pairs to be used in combinatorial reduction, the present CTD based test infrastructure makes multiple models to cover each case of a particular order of operations. Here, one model has to be created for the order of actions themselves and then a separate second model has to represent the execution state of each action (i.e., values assigned to the attributes). Further, the models have to be overlaid in order to identify the testing space that is to be used. Not only is this time consuming, but it is also error prone.

Embodiments of the present invention address such technical challenges. According to one or more embodiments of the present invention the technical challenges are addressed by identifying the attributes that require tests with a particular order of operations, and further identifying restrictions (for example, Action A must occur before Action B). Further yet, a full Cartesian product of the unique values of the attributes is determined. A combinatorial reduction and test case abatement is then applied to the set of tests using the Cartesian product to remove any redundant tests. In one or more embodiments of the present invention, identifying the attributes and the restrictions and creating the Cartesian product can be performed in a single step, i.e., using a single model.

In one or more embodiments of the present invention, the information about the ordering can be stored using a Markov chain that is used as a payload into the system that is performing CTD reduction and expansion to generate the test programs for the SUT. A Markov chain is a stochastic model describing a sequence of possible events in which the probability of each event depends only on the state attained in the previous event.

Referring now to FIG. 1, which shows a schematic illustration of a computerized environment in accordance with embodiments of the present invention. A computerized environment 100 may include one or more computerized tools. It should be noted that the depiction is one possible example of a block diagram and that some components may not be depicted for clarity.

In one or more embodiments of the present invention, a user 110, such as a developer, a QA staff member, a tester, a designer, a verification engineer or the like, may interact with the computerized environment 100. The user 110 may utilize a man-machine interface (MMI) 112 such as a terminal, a display, a keyboard, an input device or the like.

In some exemplary embodiments of the present invention, a coverage model defining tool 102 may be utilized to define the test coverage model, such as a functional coverage model, or the like. In some exemplary embodiments of the present invention, the user 110 may define the attributes that are to be tested, for example, the functional attributes in case a functional coverage is being tested. In some exemplary embodiments of the present invention, a similar tool may be utilized to define a test-space. In some exemplary embodiments, the coverage model may be adapted to be utilized as a test model.

In some exemplary embodiments of the present invention, a test execution engine 108 may be utilized to test the SUT. It will be noted that the SUT may be hardware, firmware, software, combination thereof, or any other type of computerized device. The test execution engine 108 may be a simulation-based verification tool, a test-generation platform, or the like. The test execution engine 108 may be operatively coupled to a test planning tool 106 and configured to perform testing in accordance with the test plan. In some exemplary embodiments, the test planning tool 106 may provide the tests for the test execution engine 108 to perform. It will be noted that dynamic verification is a broader concept than testing the SUT, and it further includes test planning, coverage analysis and the like. The test execution engine 108 provides only one aspect of the entire scope of operations that may be performed during dynamic verification and should not be used to construe the term "dynamic verification" narrowly.

In some exemplary embodiments of the present invention, a coverage analysis tool 104 is configured to measure coverage of the test space for the SUT based on the dynamic verification performed by the test execution engine 108. For example, the coverage analysis tool 104 can be a functional coverage analysis tool. The coverage analysis tool 104 provides a coverage measurement, such as a portion of the coverage test-space or of the defined test plan, indicative of coverage tasks that were covered during dynamic verification performed by the test execution engine 108. The user 110 may review the coverage measurement and/or the list of covered tasks.

In some exemplary embodiments of the present invention, a test planning tool 106 may define a test plan to be covered. In some exemplary embodiments of the present invention, the test plan may be a set of coverage tasks to be covered. In some exemplary embodiments of the present invention, the test plan tool 106 may provide tests that are likely to cover the test plan, such as based on a test benchmark stored in a datastore which includes tests that are known/estimated to cover specific aspects of the SUT. As another example, the test plan tool 106 is configured to generate tests so as to cover coverage tasks. The user 110 may review the test plan, the selected test or the like. In some exemplary embodiments of the present invention, the user 110 may provide parameters for the test planning tool 106 to use in determining the objective of the test plan, such as a desired interaction level. Embodiments of the present invention enable the elimination of any redundancy in the generated tests.

While the depiction in FIG. 1 has been described with specific components including the coverage model defining tool 102, coverage analysis tool 104, test planning tool 106 and the test execution engine 108, embodiments of the present invention are not limited to these components or system configurations and can be implemented with other system configuration employing fewer or additional components.

Figure 2:
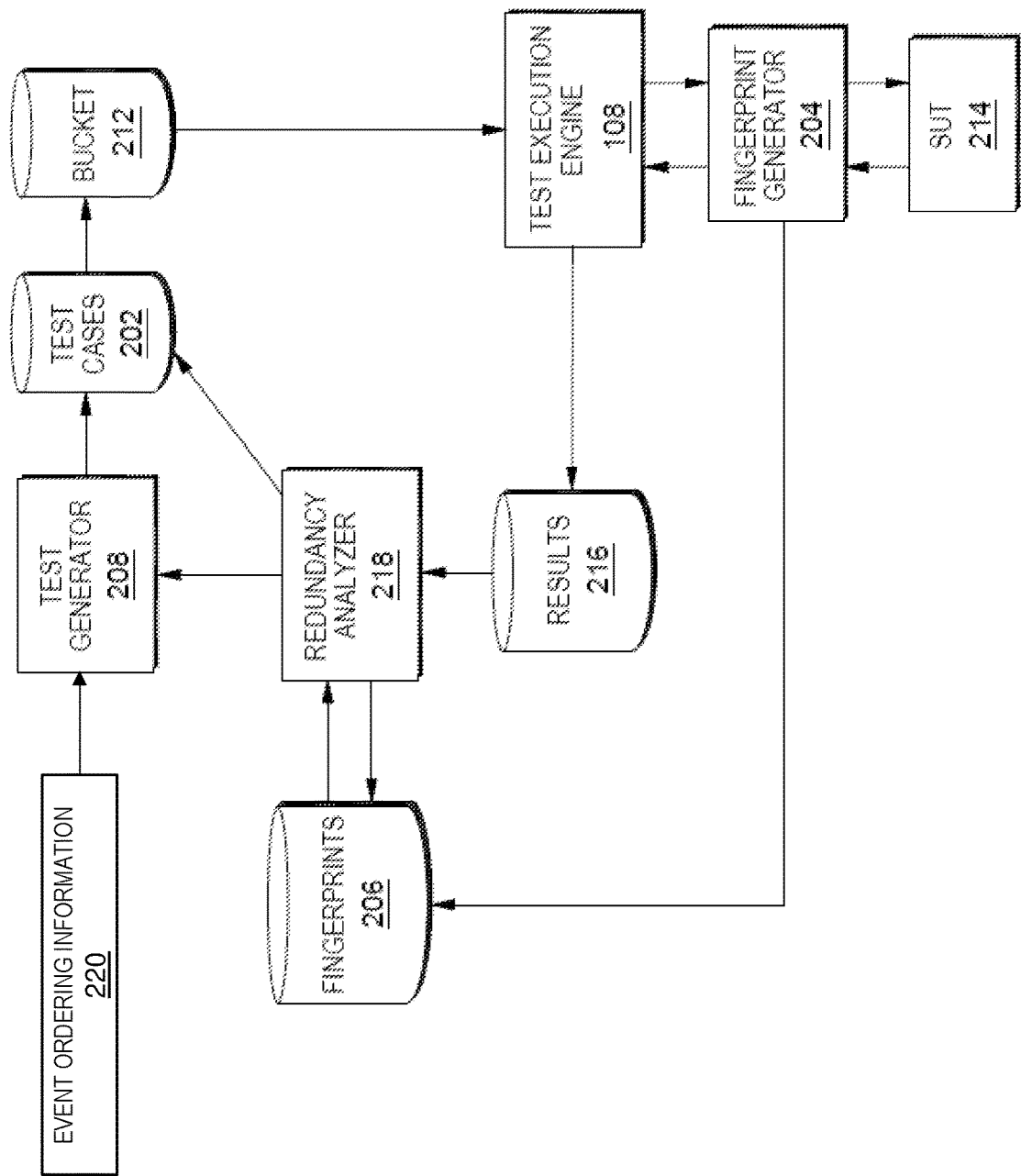
FIG. 2 is a block diagram representing modules providing a testing infrastructure according to an embodiment of the present invention.

FIG. 2 is a block diagram representing modules providing a testing infrastructure according to an embodiment of the invention. More specifically, the infrastructure includes a test generator 208. The test generator 208 accesses a test infrastructure, such as a repository of test cases 202, which stores suites of test cases available to verify the correctness of the SUT 214. Each test case specifies an input to be applied to the SUT 214 and the expected response that should be returned in response to this input (to indicate its correct operation). Typically, the test cases are organized into sets (test suites), for example, each test suite for a different component of the SUT 214.

The test generator 208 creates an execution bucket for each run of the test on the SUT 214. The bucket specifies the operations to be performed for running the desired test cases in a machine-readable language (such as XML-based). Particularly, in the case of a complete test, all the available test cases are executed on each component of the SUT 214; conversely, in the case of a regression test, the execution is limited to a subset of selected test cases. The bucket so obtained can be saved into a file.

The test generator 208 receives the event ordering information 220 according to one or more embodiments of the present invention. The event ordering information 220 indicates a particular order for a set of attributes/operations as described herein. For example, the event ordering information 220 indicates a predetermined sequential order in which attributes are to be tested. The event ordering information 220 can be provided in the form of a Markov chain in one or more embodiments of the present invention. The test generator 208 orders the tests in the bucket 212 based on the event ordering information 220.

A test execution engine 108 controls the execution of the bucket read from the file. For each test case of the bucket, this involves the application of the corresponding input to the SUT 214. In response thereto, the SUT 214 returns a corresponding output to the test execution engine 108. The test execution engine 108 determines the result of the test case by comparing its output with the corresponding expected response (extracted from the file, for example). The result of the test case (i.e., positive when the two values match and negative otherwise) is saved into a log. For example, this may be achieved by means of a standard Test Tracking Tool (TTT). The results of the (current) run of the test are available in the log for their analysis.

For a large, complex SUT 214, the test case infrastructure 202 can contain a large amount of duplicate test actions/test cases. In accordance with certain embodiments of the present invention, one technique developed to address these challenges incorporates the use of a fingerprint repository 206 with a store of information including a set of fingerprints that correspond to a plurality of regression tests stored in the test repository 202. In one embodiment, the fingerprints are generated by a fingerprint generator 204. For instance, the fingerprint repository 206 can include fingerprints of most, if not all, of the tests stored in the test repository 202 and a reference to where copies of the test are located throughout the test infrastructure, similar to an index in a book. Each fingerprint uniquely identifies a specific code path covered by a corresponding test case. In this manner, the system can identify fingerprints (and corresponding tests) that are redundant, and in some cases duplicate.

According to embodiments of the present invention, processing of the results 216 of the regression tests generated by the test generator 208 and executed by the test execution engine 108 may include determination of a code path traversed during execution of each generated regression test and generation of a fingerprint for each executed regression test based at least in part on the code path. In some embodiments of the present invention, these steps may be performed by the fingerprint generator 204.

A redundancy analyzer 218 compares fingerprints corresponding to all test cases generated by the test generator 208 to a plurality of fingerprints stored in the fingerprint repository 206. The redundancy analyzer 218 provides a list of the regression test cases generated by the test generator 208 that have matching fingerprints with one or more fingerprints stored in the fingerprint repository 206. This information is used to select and discard the duplicate test cases from the test repository 202 (as described below).

Figure 3:
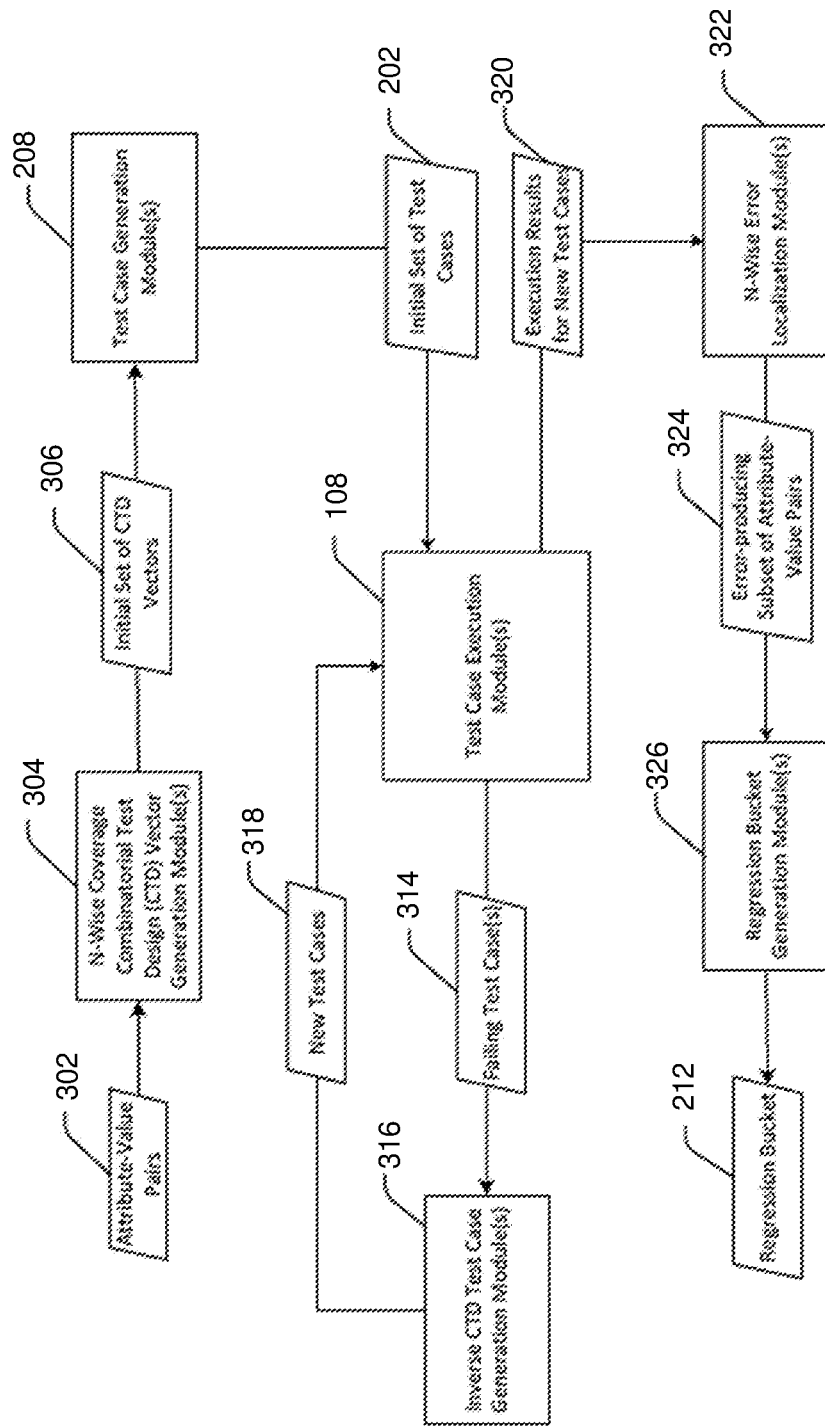
FIG. 3 is a schematic hybrid data flow/block diagram illustrating fault detection and localization using combinatorics test design (CTD) and generation of a regression bucket of failing test cases that expose a detected fault in accordance with one or more example embodiments of the present invention.
Figure 6:
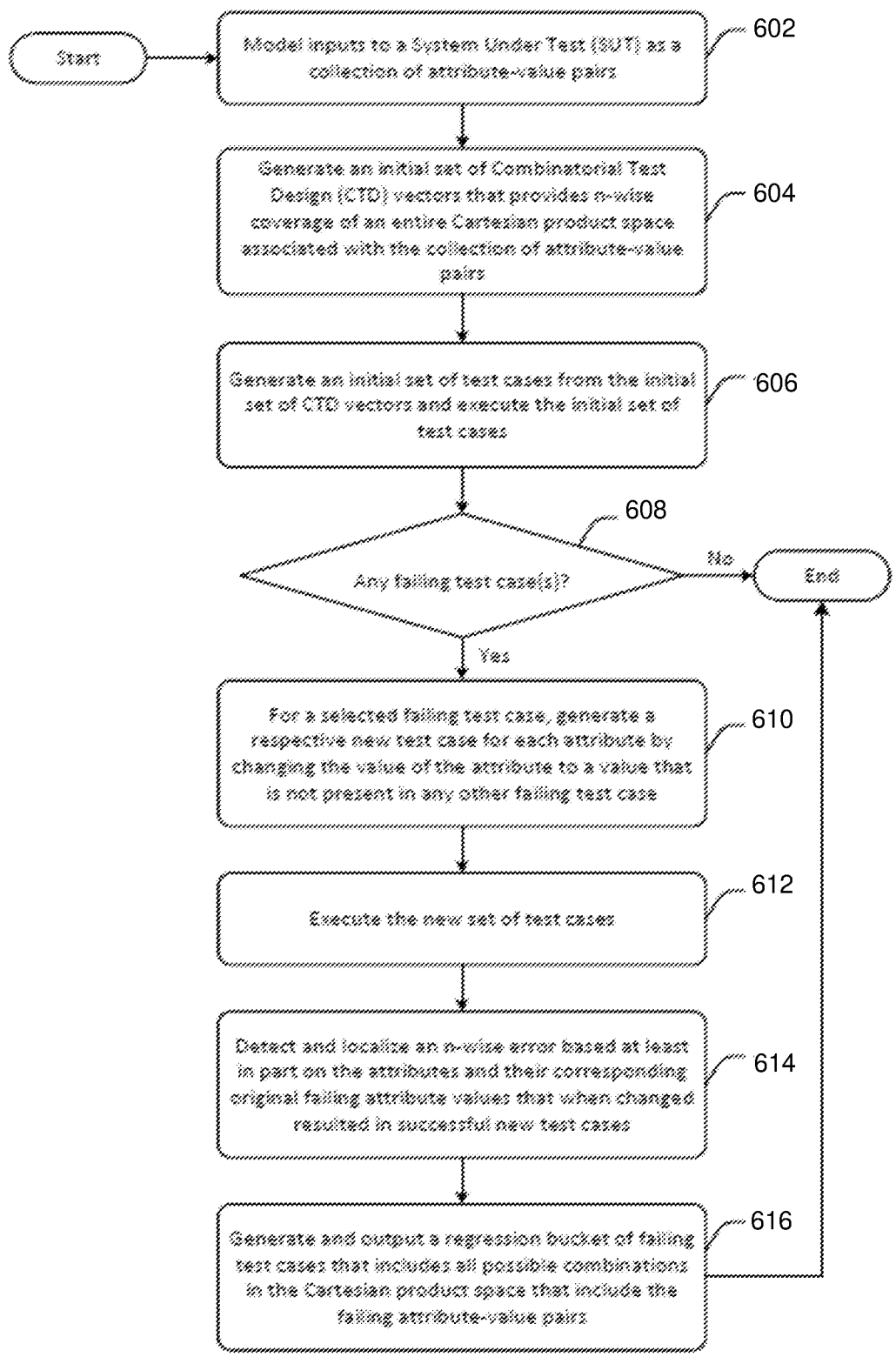
FIG. 6 is a process flow diagram of an illustrative method for detecting and localizing an n-wise fault using CTD techniques and generating a regression bucket of failing test cases that expose the detected n-wise fault in accordance with one or more example embodiments of the present invention.

FIG. 3 is a schematic hybrid data flow/block diagram illustrating fault detection and localization using CTD techniques and generation of a regression bucket of failing test cases that expose a detected fault in accordance with one or more example embodiments of the invention. FIG. 6 is a process flow diagram of an illustrative method 600 for detecting and localizing an n-wise fault using CTD techniques and generating a regression bucket of failing test cases that expose the detected n-wise fault in accordance with one or more example embodiments of the invention. FIG. 6 is described in conjunction with FIGS. 1, 2, and 3.

Illustrative methods in accordance with example embodiments of the invention and corresponding data structures (e.g., modules, units, and other such components) for performing the methods are now described. It should be noted that each operation of the method 600 depicted in FIG. 6 and/or the method 700 depicted in FIG. 7 may be performed by one or more of the modules or the like described herein. These modules may be implemented in any combination of hardware, software, and/or firmware as described herein. In certain example embodiments, one or more of these modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring to FIG. 6 in conjunction with FIG. 3, in example embodiments of the present invention, at block 602 of the method 600, inputs to the SUT 214 are modeled as a collection of attribute value pairs 302. Any number of attributes may be used to model SUT inputs and each attribute may take on any number of candidate attribute values. At block 604, computer-executable instructions of one or more n-wise coverage CTD vector generation modules 304 are executed to generate an initial set of CTD vectors 306 that provides n-wise coverage of an entire Cartesian product space associated with the collection of attribute-value pairs 302.

Figure 4:
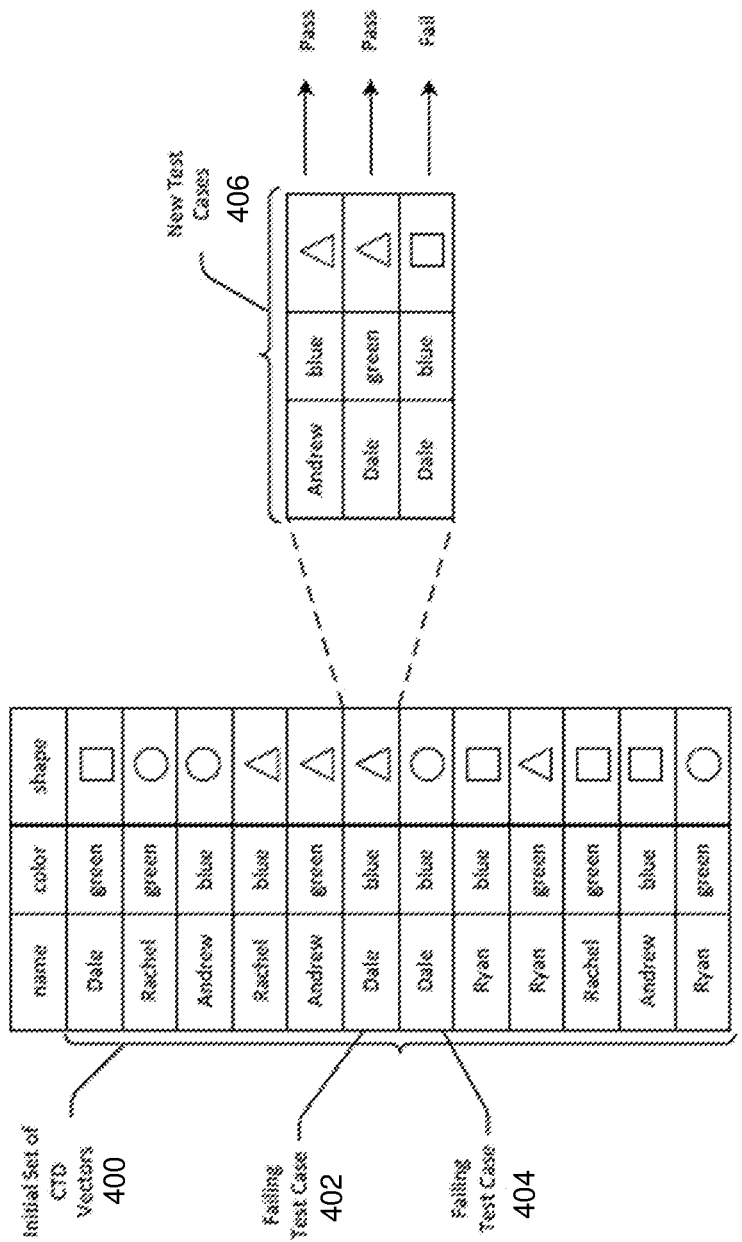
FIG. 4 depicts an example set of CTD vectors according to one or more embodiments of the present invention.

In particular, the entire Cartesian product space that contains all possible combinations of the attribute-value pairs 302 is reduced to a smaller set of CTD test vectors 306 that provides complete n-wise coverage of the entire test space. In example embodiments of the present invention, the complete n-wise coverage provided by the set of CTD vectors 306 may be complete pairwise coverage. For instance, if it is assumed that three attributes are modeled, namely, a "name" attribute, a "color" attribute, and a "shape" attribute as shown in FIG. 4, and if it is further assumed that the "name" attribute can take on 4 distinct attributes (Dale, Rachel, Andrew, and Ryan), the "color" attribute can take on 2 distinct attributes (green, blue), and the "shape" attribute can take on 3 distinct attributes (circle, square, triangle), then the total number of possible combinations of attribute-value pairs would be 4*3*2=24. Thus, in this illustrative example, the entire Cartesian product space would include 24 different combinations of attribute-value pairs.

The 24 different combinations of attribute-value pairs can be reduced down to a smaller set of combinations (i.e., the set of CTD vectors 306) that still provides complete n-wise coverage of the Cartesian product space. For instance, if complete pairwise coverage is sought, then the 24 different combinations can be reduced down to 12 distinct combinations that together include every possible pairwise interaction of attribute values. An example set of CTD vectors 400 is shown in FIG. 4. The example set of CTD vectors 400 includes all pairwise interactions between the attribute values of the attributes "name," "color," and "shape."

A binary decision diagram or the like may be used to perform the reduction and identify the reduced set of CTD vectors 306 that provides complete n-wise coverage. While each CTD vector in the set of CTD vectors 306 includes a unique combination of attribute values, the set of CTD vectors 306 itself may not be unique. That is, there may be multiple different sets of CTD vectors, each of which provides complete n-wise coverage. For instance, while FIG. 4 depicts an example set of CTD vectors 400 for the example attributes and attribute values described, it should be appreciated that alternative sets of CTD vectors that include different combinations of attribute values may also independently provide complete n-wise coverage. It should further be appreciated that while the example set of CTD vectors 400 provides complete pairwise coverage and partial three-wise coverage, a greater number of CTD vectors would be needed to provide complete three-wise coverage. Stated more generally, as n increases, the number of CTD vectors needed to provide complete n-wise coverage increases logarithmically with n.

Figure 5:
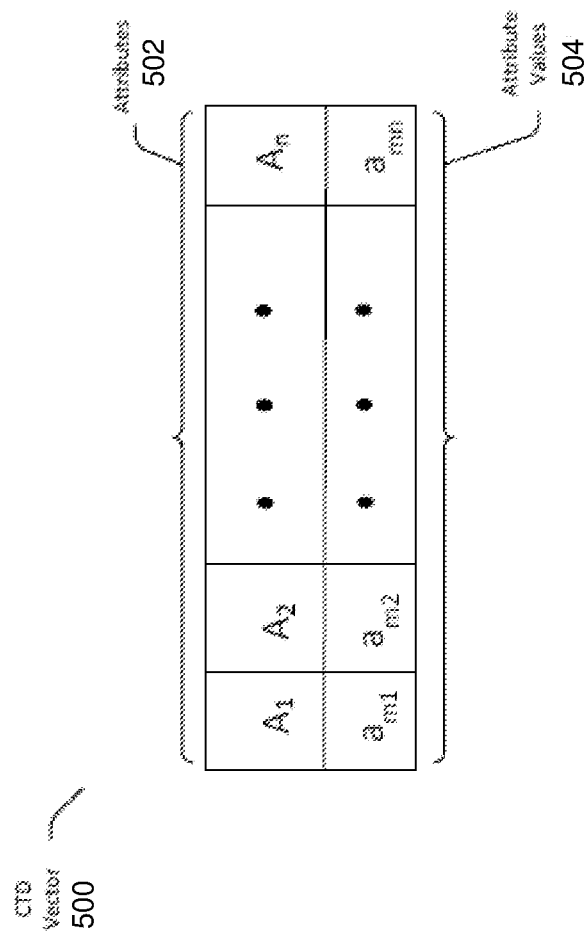
FIG. 5 depicts an example CTD vector according to one or more embodiments of the present invention.

FIG. 5 depicts an example CTD vector 500 of the type that may be included in the set of CTD vectors 306. The example CTD vector 500 includes multiple attributes 502. As previously described, the attributes 502 may be used to model inputs to the SUT 214. The attributes 502 may be associated with attribute values 504. In particular, each attribute 502 may have a corresponding attribute value 504, which may be one of one or more candidate attribute values that the attribute is allowed to take on.

Further, according to one or more embodiments of the present invention, the n-wise coverage CTD vector generation module 104 reduces the entire Cartesian product space associated with the collection of attribute-value pairs 302 down by identifying and excluding those combinations that do not adhere to the event ordering information 220. In one or more embodiments of the present invention, the event ordering information 220 is used to generate architectural restrictions associated with the SUT 214. After the entire Cartesian product space is reduced to exclude combinations that do not satisfy architectural restrictions on the SUT 214, the n-wise coverage CTD vector generation module 304, generates a further reduced initial set of CTD vectors 306. In example embodiments of the present invention, each CTD vector 306 is selected only from the reduced test space that excludes invalid combinations of attribute values that violate architectural restrictions on the SUT 214. Here, the invalid combination includes a sequence of the attributes that does not match the event ordering information 220.

Accordingly, an architectural restriction is created on the Cartesian product space that a particular first attribute has to be used before a particular second attribute according to the event ordering information 220. For example, Action A has to be performed prior to Action B no matter what. Architectural restrictions may additionally include any of a variety of restrictions on inputs to the SUT 214. For instance, an example restriction may be that if a given attribute has a particular attribute value, then one or more other attributes are excluded from having certain attribute value(s). Another example architectural restriction may be that if a given attribute has a particular attribute value, then one or more other attributes must have certain attribute value(s). Yet another example architectural restriction may be that a new attribute is introduced if and only if a particular attribute has a particular attribute value. It should be appreciated that the above examples of architectural restrictions are merely illustrative and not exhaustive.

In example embodiments of the present invention, architectural restrictions are taken into account in method 600 prior to performing the reduction of the entire Cartesian space down to the initial set of CTD vectors 306 that provides desired complete n-wise coverage. That is, particular combinations of attribute values that violate any architectural restrictions are first excluded from the Cartesian product space, and then the reduction down to the set of CTD vectors 306 that provides complete desired n-wise coverage is performed. In this manner, it can be ensured that no combination of attribute values that violates an architectural restriction is included in the initial set of CTD vectors 306.

Referring again to FIG. 6, at block 606 of the method 600, in example embodiments of the present invention, the test case generation modules 208 may be executed to generate, from the initial set of CTD test vectors 306, a corresponding set of test cases 202, which are then executed by the test case execution module(s) 108 to yield an execution result (pass or fail) for each test case.

For instance, the set of CTD test vectors 306 may be provided as input to a test case generation tool 208 that generates a respective corresponding test case for each CTD vector. Each test case in the set of test cases 202 tests the interactions among the particular combination of attribute values contained in a corresponding CTD vector of the set of CTD vectors 306. It should be appreciated that a set of CTD vectors and their corresponding test cases may, at times herein, be described and/or depicted interchangeably. For instance, the example set of CTD vectors 400 depicted in FIG. 4 may be interchangeably thought of as the corresponding set of test cases that test the particular combinations of attribute values represented by the set of CTD vectors 400.

In addition, the test generator 208 receives the event ordering information 220 according to one or more embodiments of the present invention. The event ordering information 220 indicates a particular order for a set of attributes/operations as described herein. The event ordering information 220 can be provided in the form of a Markov chain in one or more embodiments of the present invention. The test generator 208 orders the tests in the bucket 212 based on the event ordering information 220.

At block 608 of the method 600, computer-executable instructions of the test case execution module(s) 108 are executed to determine whether any test cases in the set of test cases 202 failed. In example embodiments of the present invention, execution of each test case 202 results in either a successful execution result, indicating that the combination of attribute values contained in the corresponding CTD vector 306 does not contain an n-wise (or m-wise where m<n) error, or a failure execution result, indicating that the combination of attribute values in the corresponding CTD vector 306 does contain an n-wise (or m-wise where m<n) error.

Referring to the example depicted in FIG. 4, test cases corresponding to the example set of CTD vectors 400 are executed at block 606 to yield a respective execution result for each test case. In particular, two test cases 402 and 404 are illustratively depicted in FIG. 4 as resulting in failure. Failing test case 402 tests the following combination of attribute values: Dale; blue; triangle, which respectively correspond to the attributes name, color, and shape. Failing test case 404 tests the following combination of attribute values: Dale; blue; circle, which respectively correspond to the attributes name, color, and shape. Although "Dale" and "blue" are present both in the CTD vector corresponding to failing test case 402 and in the CTD vector corresponding to failing test case 404, it is unclear at this stage in the process as to whether "Dale" and "blue" are generating a pairwise error; whether "Dale" and ("triangle" or "circle") are generating the pairwise errors; or whether "blue" and ("triangle" or "circle") are generating the pairwise errors. Subsequent operations of method 600 can utilize inverse combinatorics to expand the test space around a selected failing test case to detect and localize the particular combination of attribute values that are causing the n-wise error (pairwise error in the case of the example depicted in FIG. 4).

Responsive to a negative determination at block 608, the method 600 may end because none of the initial set of test cases 202 has failed. Because the initial set of CTD vectors 306 (based on which the set of test cases 202 are generated) provided complete n-wise coverage, it can be ensured that an n-wise or lesser order error is not present. However, successful execution of all of the test cases in the initial set of test cases 202 does not ensure that a higher order error (k-wise where k>n) is not present.

On the other hand, in response to a positive determination at block 608 indicating that execution of the set of test cases 202 results in one or more failing test cases 314, the method 600 includes using an inverse CTD test case generation module 316 to execute and to select a particular failing test case 314 and apply inverse combinatorics to the selected failing test case 314 to produce a new set of test cases 318 capable of being used to detect and localize the combination of attribute values that are causing the n-wise or lesser order error.

In example embodiments of the present invention, application of inverse combinatorics to the selected failing test case 314 includes generating a respective new test case 318 with respect to each attribute. Thus, the number of new test cases generated may be equal to the number of attributes. In example embodiments, in each new test case 318, the attribute value in the selected failing test case 314 of a corresponding attribute is changed to an attribute value for that attribute that is not present in any other failing test case and the respective attribute value for each other attribute is unchanged from that which is present in the selected failing test case 314.

Referring again to the example depicted in FIG. 4, assuming that failing test case 402 is selected at block 610, then the example set of new test cases 406 may be generated. In example embodiments of the present invention, each example new test case 406 may be generated by changing the attribute value of a corresponding attribute in the selected failing test case 402 to a different value that is not present in any other failing test case. For instance, a first new test case corresponding to the CTD vector<Andrew, blue, triangle> is obtained by changing the attribute value of the "name" attribute in the failing test case 402 from "Dale" to "Andrew" while keeping the attribute values for the other attributes the same as in the failing test case 402. Similarly, a second new test case corresponding to the CTD vector<Dale, green, triangle> is obtained by changing the attribute value of the "color" attribute in the failing test case 402 from "Blue" to "Green" while keeping the attribute values for the other attributes the same as in the failing test case 402. Lastly, a third new test case corresponding to the CTD vector<Dale, blue, square> is obtained by changing the attribute value of the "shape" attribute in the failing test case 402 from "triangle" to "square" while keeping the attribute values for the other attributes the same as in the failing test case 402.

It should be appreciated that the respective attribute value that is changed to obtain each new test case 406 is obviously not present in the selected failing test case 402. Moreover, each changed attribute value is not present in any other failing test case as well (e.g., failing test case 404). Specifically, the changed attribute value "Andrew" for the first new test case is not present in any failing test case; the changed attribute value "green" for the second new test case is not present in any failing test case; and the changed attribute value "square" for the third new test case is not present in any failing test case.

After generating the set of new test cases 318 by performing inverse combinatorics on a selected failing test case 314, the test case execution module(s) 108 is used for executing the new test cases 318, at block 612 of the method 600. Further, at block 614, one or more n-wise error localization modules 322 detect and localize an n-wise or lesser order error based on the attributes and their corresponding original failing attribute values in the selected failing test case 314 that when changed resulted in new test cases that pass. In particular, computer-executable instructions of the n-wise error localization module(s) 322 are executed to assess execution results 320 for the set of new test cases 318 to detect and localize an n-wise or lesser order error based on those new test cases that yield a successful execution result. As used herein, a lesser order error refers to an m-wise error where m<n, assuming complete n-wise coverage by the set of CTD vectors 306.

Referring again to the example depicted in FIG. 4 which assumes detection and localization of a pairwise error, execution of the set of new test cases 406 results in the first new test case corresponding to the CTD vector<Andrew, blue, triangle> passing; the second new test case corresponding to the CTD vector<Dale, green, triangle> passing; and the third new test case corresponding to the CTD vector<Dale, blue, square> failing. In example embodiments, the n-wise error localization module(s) 322 determine, based on the failing execution result for the third new test case, that the "shape" attribute is not contributing to a pairwise error because changing the attribute value from "triangle" in the failing test 402 to "square" in the third new test case continues to result in failure.

On the other hand, the n-wise error localization module(s) 322 may determine that the attributes whose attribute values were changed to obtain the new test cases that passed execution do contribute to the pairwise error. Specifically, in example embodiments of the present invention, based on the successful execution result for the first new test case corresponding to the CTD vector<Andrew, blue, triangle>, the n-wise error localization module(s) 322 determines that the "name" attribute and the original failing attribute value "Dale" are contributing to the pairwise error. Similarly, in example embodiments, based on the successful execution result for the second new test case corresponding to the CTD vector<Dale, green, triangle>, the n-wise error localization module(s) 322 determines that the "color" attribute and the original failing attribute value "blue" are also contributing to the pairwise error.

Thus, based on the execution results 320 for the set of new test cases 318, the n-wise error localization module(s) 322 can determine, in the example depicted in FIG. 4, that the attributes "name" and "color" having the attribute values "Dale" and "blue," respectively, are responsible for the pairwise error. Stated more generally, the n-wise error localization module(s) 322 can determine the specific attribute-value pairs that cause an n-wise or lesser order error based on an assessment of the execution results 320 for the set of new cases 318, and more specifically, the original attribute values that were changed in the selected failing test case to obtain passing new test cases.

The example depicted in FIG. 4 assumes an initial set of CTD vectors 400 that provides complete pairwise coverage, in which case, a pairwise or lesser order error (e.g., a single attribute value that causes an error) can be detected and localized in a single pass of applying inverse combinatorics on a selected failing test case to obtain the set of new test cases 318. In general, if the initial set of CTD vectors 306 provides n-wise coverage, then a single pass of applying inverse combinatorics on a selected failing test case reveals an n-wise or lesser order error. While a k-wise error where k>n may be detectable using an initial set of CTD vectors that provides complete n-wise coverage, this is not a guarantee because the initial set of CTD vectors 306 would not include all k-wise interactions. However, an initial set of CTD vectors 306 that provides complete n-wise coverage (e.g., complete pairwise coverage) may provide some degree of k-wise coverage where k>n (e.g., three-wise coverage), and thus, based on the particular CTD vectors that are chosen, the method 600 can reveal a k-wise error at a single pass or after multiple passes of applying inverse combinatorics to selected failing test cases.

Referring again to FIG. 6, at block 616 of the method 600, computer-executable instructions of one or more regression bucket generation module(s) 326 are executed to generate and output a regression bucket 212 of failing test cases that includes all possible combinations in the Cartesian product space that include the original failing attribute-value pairs. The regression bucket generation module 326, in example embodiments of the present invention, receives an indication of the error-producing subset of attribute-value pairs 324 as input and determines and outputs the regression bucket 212 that includes only those test cases that correspond to all possible combinations in the Cartesian product space that include the particular attribute values that are causing the detected error.

Referring again to the example of FIG. 4, the regression bucket generation module 326 receives as input the attributes "name" and "color" and the corresponding attribute values "Dale" and "blue" that are causing the pairwise error, determines all attribute-value combinations in the Cartesian product space that include "Dale" and "blue," and populates the regression bucket 212 with test cases corresponding to all of these combinations. In this example, the regression bucket 212 includes the following test cases: (Dale, blue, triangle); (Dale, blue, circle); and (Dale, blue, square). Because each of the test cases in the regression bucket 212 includes the attribute values "Dale" and "blue" for the attributes "name" and "color," respectively, which together are contributing to the detected pairwise error, each test case in the regression bucket 212 is ensured to fail. In example embodiments of the present invention, the regression bucket 212 can be outputted for use by a manual tester or another automated debugging algorithm. The regression bucket 212 of failing test cases can be used to verify whether the detected error has been corrected because all test cases contained in the regression bucket 212 will pass only when the error is fixed. Thus, if any test case in the regression bucket 212 continues to fail despite modifications made to the SUT 214 in an attempt to correct the error, then this indicates that the error has not been completely resolved.

Another technical challenge with the testing infrastructure is that when verifying the quality of the SUT 214, a diverse and robust sequence of tests has to be used to adequately cover as many scenarios the SUT 214 may be subjected to as possible. Certain scenarios require a specific order of events to occur to guarantee that a given service or path is exercised, as described herein. Some scenarios may not necessitate that a specific order of events occur. For these scenarios to be tested, the technical challenge is to introduce more randomness into the test system to represent a production environment where the SUT 214 will likely operate.

One or more embodiments of the present invention address such technical challenges by using Markov chains. A Markov chain is a mathematical construct used to model state changes in the SUT 214 based on random probabilities of a specific event occurring while the SUT 214 is in a given state. The probability of an event occurring to any given state can be tuned to control how much order or randomness the SUT 214 will be subjected to by the test cases executed by the testing infrastructure.

Figure 7:
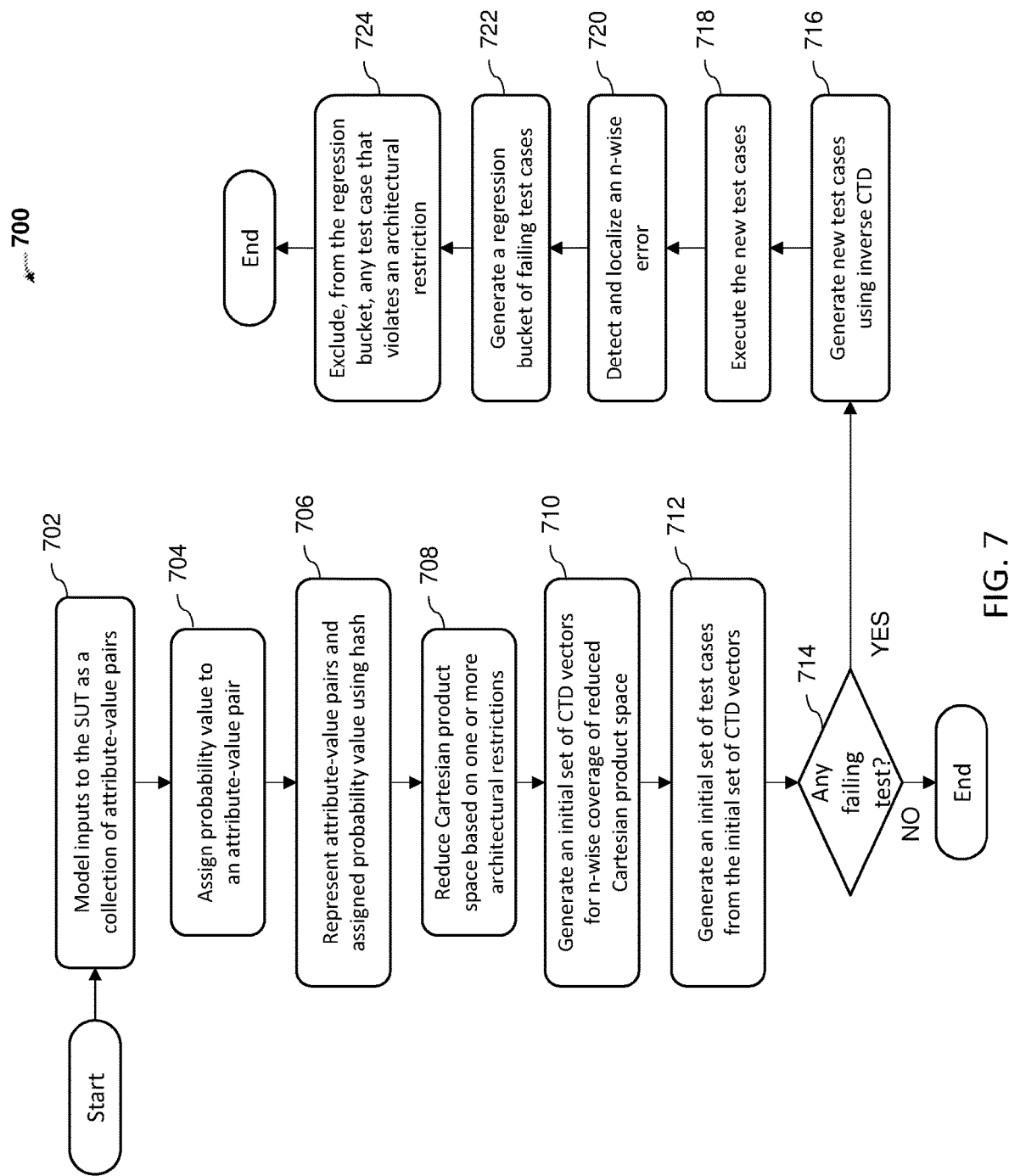
FIG. 7 depicts a flowchart for providing a deterministic order of tests to run for the system under test in the testing infrastructure according to one or more embodiments of the present invention.

FIG. 7 depicts a flowchart for providing a deterministic order of tests to run for the SUT 214 in the testing infrastructure according to one or more embodiments of the present invention. The method 700 that is depicted includes modeling the attribute-value pairs for the testing, at block 702. The modeling is similar to that performed in the method 600. The method further includes assigning a probability factor to an attribute-value pair, at block 704. In one or more embodiments of the present invention, each attribute-value pair is assigned a respective probability value.

The probability value indicates a probability of the attribute-value being selected for generating a test case. Alternatively, or in addition, the probability value indicates a probability of a test case associated with that attribute-value being selected to be executed in the bucket 212 of tests. The probability value can be manually configured by a test engineer to facilitate higher (or lower) chance that a particular attribute-value is tested. In an example, setting the probability value to '1' ensures that the attribute-value pair is tested. Conversely, setting the probability value to '0' ensures that the attribute-value pair is not tested.

In one or more embodiments of the present invention, the selected attribute-value pairs and their respective assigned probability value is stored in the form of a hash value, at block 706. In other words, a hash represents an attribute-value pair and a probability value assigned to that pair. In one or more embodiments of the present invention, unique hashes are generated for each of the attribute-value pairs and its probability value. In one or more embodiments of the present invention, to ensure unique hashes prime number modulus, multiplication, etc. operations may be used. The attribute-value pairs and corresponding probability values are accordingly stored has a hash table, facilitating a processor to use techniques such as binary decision diagram or the like to perform a reduction to identify the reduced set of CTD vectors 306 that provides complete n-wise coverage. Binary decision diagram can be applied as described elsewhere herein.

At block 708 of the method 700, the n-wise coverage CTD vector generation module 304 reduces the entire Cartesian product space associated with the collection of attribute-value pairs 302 down by identifying and excluding those combinations that do not adhere to architectural restrictions associated with the SUT 214. For example, an event ordering information 220, a restriction about a particular value of the attribute, and other types of architectural restrictions can be associated with one or more of the attribute-value pairs.

After the entire Cartesian product space is reduced to exclude combinations that do not satisfy architectural restrictions on the SUT 214, the n-wise coverage CTD vector generation module 304 generates the further reduced initial set of CTD vectors 306, at block 710 of the method 700. In example embodiments, each CTD vector 306 is selected only from the reduced test space that excludes invalid combinations of attribute values that violate architectural restrictions on the SUT 214. The CTD vector 306 is selected based on the probability value assigned with the attribute-value pair. To facilitate the probability value to have effect in selection of the attribute-value pair, a Markov chain is used to represent each selection as a state. The mathematical construct of the Markov chain then models state changes based on the probabilities of a specific event occurring (i.e., selection of a particular attribute-value pair) while the system is in a given state (i.e., presently selected attribute-value pair).

At block 712 of the method 700, the initial set of test cases 202 is generated from the initial set of CTD vectors 306 and executed similar to block 606 of the method 600. At block 714, a determination is made as to whether any of test cases 202 failed similar to the determination at block 608 of the method 600. In response to a negative determination at block 714, the method 700 ends because none of test cases 202 produce a failing execution result. On the other hand, in response to a positive determination at block 714, the method 700 proceeds to block 716, where the inverse CTD test case generation module 316 generates the new test cases 318 from a selected failing test case.

In one or more embodiments of the present invention, a respective set of new test cases is generated for each attribute by changing the attribute value for that attribute in the selected failing test case to each other candidate attribute value for that attribute that is not present in any of the failing test cases. For example, a single new test case is generated with respect to each attribute in a selected failing test case by changing the attribute value for the attribute to another attribute value that the attribute is eligible to have and that is not present in any failing test case. While there may be multiple attribute values for an attribute that are not present in any failing test case, each new test case generated only tests one such attribute value, and thus, in this technique of creating new tests, each new test case can be generated simply by oscillating a corresponding attribute value in the selected failing test case to one other attribute value that is not present in any failing test case.

Alternatively, in one or more embodiments of the present invention, for each attribute in a selected failing test case, a new test case is generated for each possible attribute value for that attribute that is not present in any failing test case. Thus, according to the this second technique, if there are multiple attribute values for an attribute that are not present in any failing test case, a new test case is generated for each such attribute value.

In the example depicted in FIG. 4, for instance, inverse combinatorics are applied to the failing test case 402 to obtain the set of new test cases 406 according to the first technique above. That is, a single new test case is shown as being generated with respect to each attribute in the selected failing test case 402 by changing the corresponding attribute value for that attribute in the selected failing test case 402 to another candidate attribute value that is not present in any failing test case. If, on the other hand, the set of new test cases 406 was instead generated according to the second technique above, the set of new test cases 406 includes the following additional test cases: (Ryan, blue, triangle) and (Rachel, blue, triangle) because the attribute values "Ryan" and "Rachel" are also not present in any failing test case.

Further, the inverse CTD test case generation module 316 excludes any of the new test cases that violate an architectural restriction on the SUT 214. The set of new test cases 318 obtained via the inverse combinatorics expansion is accordingly reduced to a smaller set by excluding (and not executing) one or more new test cases that violate one or more architectural restrictions. In particular, when a selected test case corresponding to an initial CTD vector 306 fails and is selected for expansion to obtain the set of new test cases 318 designed to detect and localize an n-wise error, the expansion may be performed first without taking into account any architectural restrictions. Then, any new test cases generated from the expansion that violate an architectural restriction can be excluded from the set of new test cases 318. In this manner, it can be ensured that the expansion provides as much coverage of the test space in the neighborhood around the failing test case as possible.

Further, the method 700 includes executing the reduced set of new tests 318, at block 718, similar to block 612 of the method 600. At block 720 of the method 700, an n-wise error is detected and localized based at least in part on the attributes and their corresponding attribute values in the selected failing test case that when changed produce a new test case that passes, similar to block 614 of the method 600. Further, at block 722, the regression bucket 212 of failing test cases is generated similar to block 616 of the method 600. Each test case in the regression bucket 212 corresponds to a particular combination of attribute values that includes the failure-producing subset of attribute value pairs 324 such that the regression bucket 212 covers all possible combinations of attribute-value pairs that adhere to architectural restrictions on the SUT 214 and that include the failure-producing attribute values. Further yet, at block 724, any failing test case that violates an architectural restriction can be excluded from the regression bucket 212.

Accordingly, the method 700 facilitates the regression bucket 212 of failing test cases to be generated without regards to architectural restrictions, and then any test case that violates an architectural restriction can be excluded from the regression bucket 212. That is, test cases corresponding to all possible combinations in the entire Cartesian product test space that include the particular combination of attribute values causing an n-wise or lesser order error may first be generated and included in the regression bucket 212, and then the regression bucket 212 may be reduced to exclude any test case(s) that violate a restriction. In alternative example embodiments, the test cases included in the regression bucket 212 may be selected from the reduced Cartesian space from which the initial set of CTD vectors are selected, in which case, the regression bucket 212 would be generated to include only those combinations of attribute values that include the subset of attribute values causing the error and that do not violate any architectural restriction.

In addition, the tests that are selected are based on the probability values that are tuned for each attribute-value pair. Therefore, a first attribute-value pair with a higher probability value has a higher chance of being tested than a second attribute-value pair with a probability value that is lower than that of the first attribute-value pair. A test engineer can accordingly control the selection of tests in the CTD based test infrastructure.

Figure 8:
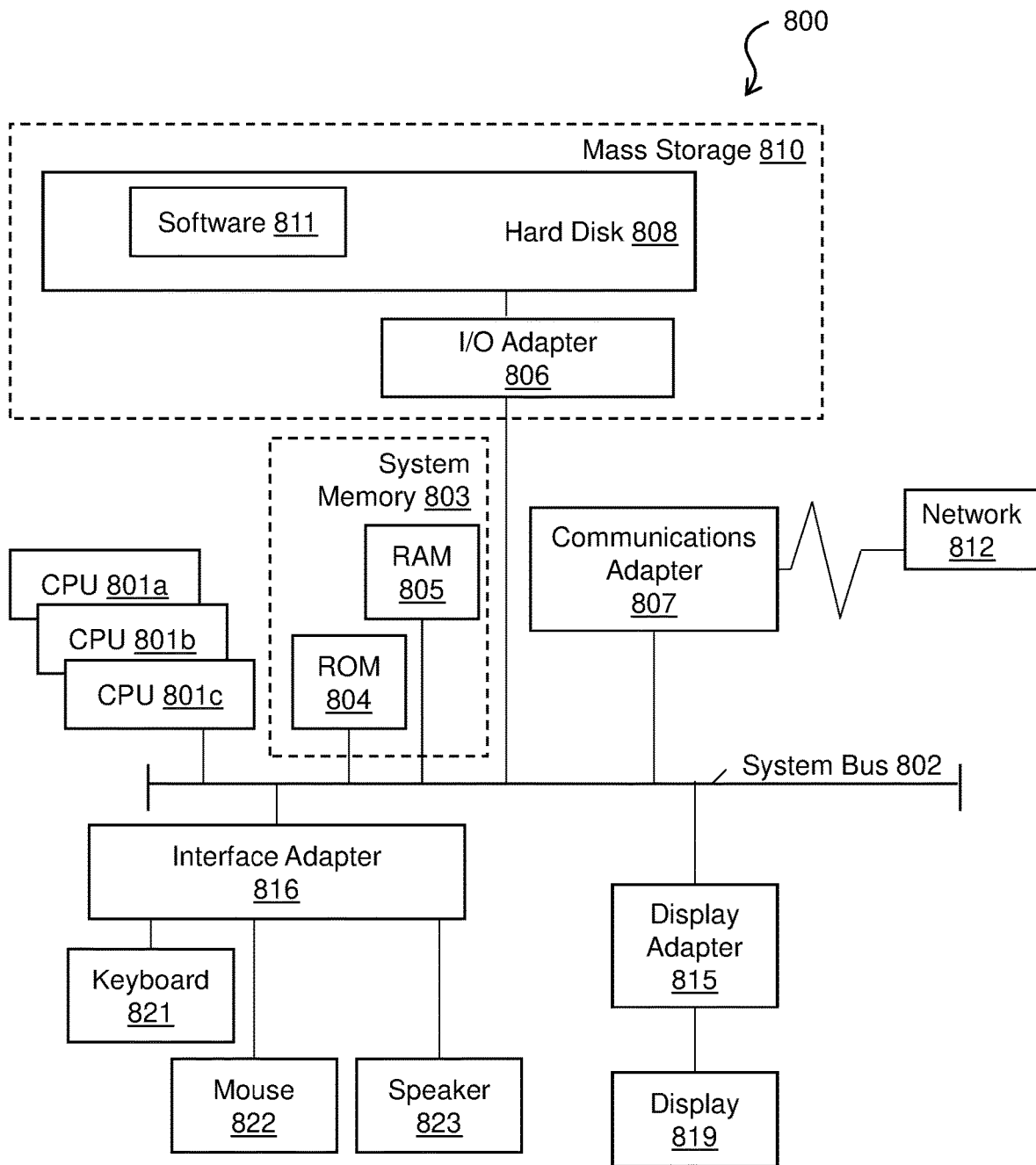
FIG. 8 depicts a computer system according to one or more embodiments of the present invention.

Turning now to FIG. 8, a computer system 800 is generally shown in accordance with an embodiment of the present invention. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801a, 801b, 801c, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein below with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

In one or more embodiments of the present invention, the computer system 800 can be the environment 100 with the SUT being a computer program or a hardware component being used by the computer system 800. In one or more embodiments of the present invention, the computer system 800 can be the SUT 214, which is part of a server cluster.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for detecting and localizing a fault in a system under test (SUT), the method comprising:
   modeling inputs to the SUT as a collection of attribute-value pairs;
   assigning a probability value to each attribute-value pair from the collection of attribute-value pairs;
   reducing a Cartesian product space comprising all possible combinations of the attribute-value pairs to a reduced test space, at least in part by excluding one or more combinations of attribute-value pairs based on corresponding probability values;
   generating an initial set of test vectors that provides complete n-wise coverage of the reduced test space;
   generating an initial set of test cases from the initial set of test vectors;
   executing the initial set of test cases to obtain a first set of execution results;
   determining, based at least in part on the first set of execution results, that one or more test cases failed execution;
   generating a set of new test cases from a selected failing test case;
   executing the set of new test cases to obtain a second set of execution results; and
   detecting and localizing the fault based at least in part on the second set of execution results.

2. The method of claim 1, wherein the Cartesian product space is further reduced based on an architectural restriction of the SUT.

3. The method of claim 2, wherein the architectural restriction comprises at least one of: a requirement that a first attribute cannot take on one or more candidate attribute values if a second attribute has a particular attribute value, a requirement that the first attribute must take on a particular candidate attribute value if the second attribute has the particular attribute value, or a requirement to introduce a third attribute if the second attribute has the particular attribute value.

4. The method of claim 1, wherein an attribute-value pair and a corresponding probability value are represented in a hash.

5. The method of claim 1, wherein a first attribute-value pair that is to be tested is assigned a first probability value that is higher than a second probability value of a second attribute-value pair.

6. The method of claim 1, wherein detecting and localizing the fault based at least in part on the second set of execution results comprises determining a particular combination of attribute values that causes the fault.

7. The method of claim 6, further comprising generating a regression bucket of failing test cases based at least in part on the particular combination of attribute values that causes the fault.

8. A system comprising:
   a memory; and
   a processor coupled with the memory, the processor configured to perform a method for detecting and localizing a fault in a system under test (SUT), the method comprising:
      modeling inputs to the SUT as a collection of attribute-value pairs;
      assigning a probability value to each attribute-value pair from the collection of attribute-value pairs;
      reducing a Cartesian product space comprising all possible combinations of the attribute-value pairs to a reduced test space, at least in part by excluding one or more combinations of attribute-value pairs based on corresponding probability values;
      generating an initial set of test vectors that provides complete n-wise coverage of the reduced test space;
      generating an initial set of test cases from the initial set of test vectors;
      executing the initial set of test cases to obtain a first set of execution results;
      determining, based at least in part on the first set of execution results, that one or more test cases failed execution;
      generating a set of new test cases from a selected failing test case;
      executing the set of new test cases to obtain a second set of execution results; and
      detecting and localizing the fault based at least in part on the second set of execution results.

9. The system of claim 8, wherein the Cartesian product space is further reduced based on an architectural restriction of the SUT.

10. The system of claim 9, wherein the architectural restriction comprises at least one of: a requirement that a first attribute cannot take on one or more candidate attribute values if a second attribute has a particular attribute value, a requirement that the first attribute must take on a particular candidate attribute value if the second attribute has the particular attribute value, or a requirement to introduce a third attribute if the second attribute has the particular attribute value.

11. The system of claim 8, wherein an attribute-value pair and a corresponding probability value are represented in a hash.

12. The system of claim 8, wherein a first attribute-value pair that is to be tested is assigned a first probability value that is higher than a second probability value of a second attribute-value pair.

13. The system of claim 8, wherein detecting and localizing the fault based at least in part on the second set of execution results comprises determining a particular combination of attribute values that causes the fault.

14. The system of claim 13, wherein the method further comprises generating a regression bucket of failing test cases based at least in part on the particular combination of attribute values that causes the fault.

15. A computer program product comprising a non-transitory computer-readable storage media having computer-executable instructions stored thereupon, which when executed by a processor cause the processor to perform a method for detecting and localizing a fault in the SUT, the method comprising:
   modeling inputs to the SUT as a collection of attribute-value pairs;
   assigning a probability value to each attribute-value pair from the collection of attribute-value pairs;

reducing a Cartesian product space comprising all possible combinations of the attribute-value pairs to a reduced test space, at least in part by excluding one or more combinations of attribute-value pairs based on corresponding probability values;

generating an initial set of test vectors that provides complete n-wise coverage of the reduced test space;

generating an initial set of test cases from the initial set of test vectors;

executing the initial set of test cases to obtain a first set of execution results;

determining, based at least in part on the first set of execution results, that one or more test cases failed execution;

generating a set of new test cases from a selected failing test case;

executing the set of new test cases to obtain a second set of execution results; and detecting and localizing the fault based at least in part on the second set of execution results.

16. The computer program product of claim 15, wherein the Cartesian product space is further reduced based on an architectural restriction of the SUT.

17. The computer program product of claim 16, wherein the architectural restriction comprises at least one of: a requirement that a first attribute cannot take on one or more candidate attribute values if a second attribute has a particular attribute value, a requirement that the first attribute must take on a particular candidate attribute value if the second attribute has the particular attribute value, or a requirement to introduce a third attribute if the second attribute has the particular attribute value.

18. The computer program product of claim 15, wherein an attribute-value pair and a corresponding probability value are represented in a hash.

19. The computer program product of claim 15, wherein a first attribute-value pair that is to be tested is assigned a first probability value that is higher than a second probability value of a second attribute-value pair.

20. The computer program product of claim 15, wherein detecting and localizing the fault based at least in part on the second set of execution results comprises determining a particular combination of attribute values that causes the fault.

21. The computer program product of claim 20, wherein the method further comprises generating a regression bucket of failing test cases based at least in part on the particular combination of attribute values that causes the fault.

22. A method for detecting and localizing a fault in a system under test (SUT), the method comprising:

modeling inputs to the SUT as a collection of attribute-value pairs;

assigning a probability value to each attribute-value pair from the collection of attribute-value pairs;

reducing a Cartesian product space comprising all possible combinations of the attribute-value pairs to a reduced test space, at least in part by excluding one or more combinations of attribute-value pairs based on corresponding probability values;

generating an initial set of test vectors that provides complete n-wise coverage of the reduced test space;

generating an initial set of test cases from the initial set of test vectors;

executing the initial set of test cases to obtain a first set of execution results;

determining, based at least in part on the first set of execution results, that one or more test cases failed execution;

generating a set of new test cases from a selected failing test case, wherein generating the set of new test cases comprises generating, in relation to each attribute in the selected failing test case, a respective subset of new test cases at least in part by changing a respective attribute value for the attribute in the selected failing test case to each other candidate attribute value for the attribute that is not present in any of the one or more test cases that failed execution;

executing the set of new test cases to obtain a second set of execution results; and detecting and localizing the fault based at least in part on the second set of execution results.

23. The method of claim 22, wherein an attribute-value pair and a corresponding probability value are represented in a hash value.

24. A method for detecting and localizing a fault in a system under test (SUT), the method comprising:

modeling inputs to the SUT as a collection of attribute-value pairs;

reducing the test space comprising all possible combinations of the attribute-value pairs to a reduced test space at least in part by excluding one or more combinations of attribute-value pairs based on corresponding probability values;

generating an initial set of test vectors that provides complete n-wise coverage of the reduced test space associated with the collection of attribute-value pairs;

generating an initial set of test cases from the initial set of test vectors;

executing the initial set of test cases to obtain a first set of execution results;

determining, based at least in part on the first set of execution results, that one or more test cases failed execution;

generating a set of new test cases from a selected failing test case, wherein generating the set of new test cases comprises changing a respective attribute value in the selected failing test case to generate each new test case;

executing the set of new test cases to obtain a second set of execution results; and detecting and localizing the fault based at least in part on the second set of execution results.

25. The method of claim 24, wherein an attribute-value pair and a corresponding probability value are represented in a hash.

* * * * *